(12) United States Patent
Lang et al.

(10) Patent No.: US 6,447,128 B1
(45) Date of Patent: Sep. 10, 2002

(54) REARVIEW MIRROR ASSEMBLY FOR A VEHICLE WITH MONITOR

(75) Inventors: Heinrich Lang, Ergersheim; Michael Witzke, Ansbach, both of (DE)

(73) Assignee: Lang-Mekra North America LLC, Ridgeway, SC (US)

( * ) Notice: Subject to any disclaimer, the term of this patent is extended or adjusted under 35 U.S.C. 154(b) by 0 days.

(21) Appl. No.: 09/731,574

(22) Filed: Dec. 7, 2000

(30) Foreign Application Priority Data

Jul. 28, 2000 (DE) .......................... 100 36 875

(51) Int. Cl.[7] ............................................ G02B 7/182
(52) U.S. Cl. ...................... 359/871; 359/872; 359/877
(58) Field of Search .............................. 359/871, 872, 359/838, 850, 851, 843, 877; 248/466, 476; 340/815.4, 525, 438, 654, 461, 468, 474, 905, 463, 815; 307/10.1

(56) References Cited

U.S. PATENT DOCUMENTS

| | | |
|---|---|---|
| 809,698 A | 1/1906 | Kelley |
| 1,528,082 A | 3/1925 | Schlaich |
| 1,849,708 A | 3/1932 | Colbert et al. |
| 1,884,759 A | 10/1932 | Hodny |
| 1,908,767 A | 5/1933 | Hodny |
| D92,937 S | 7/1934 | Vail |
| 3,060,401 A | 11/1936 | Smith |
| 2,166,303 A | 7/1939 | Hodny et al. |
| 2,180,610 A | 11/1939 | Ritz-Woller |
| 2,190,123 A | 2/1940 | Pace |

(List continued on next page.)

FOREIGN PATENT DOCUMENTS

| | | |
|---|---|---|
| AU | 415830 | 3/1968 |
| DE | 2359285 | 5/1974 |
| DE | 19741896 A1 | 4/1999 |
| DE | 19921488 | 11/2000 |
| EP | 1022191 A2 | 7/2000 |
| EP | 1032209 | 8/2000 |
| EP | 1033693 | 9/2000 |
| GB | 14405670 | 6/1976 |
| GB | 2351055 A | 7/2000 |

(List continued on next page.)

OTHER PUBLICATIONS

European Search Report dated Jan. 14, 2002 with Verified English translation.
English language Abstract of JP 58085110.
English language Abstract of JP 62091092.
English language Abstract of JP 62166135.
English language Abstract of JP 04257189.
English language Abstract of JP 05137144.
English language Abstract of JP 09272399.
English language Abstract of JP 10076880.
English language Abstract of JP 2000062532.
English language Abstract of JP 2000128031.

(List continued on next page.)

Primary Examiner—Mohammad Sikder
(74) Attorney, Agent, or Firm—Dority & Manning, P.A.

(57) ABSTRACT

A rearview mirror assembly for a vehicle is provided. The rearview mirror assembly includes a monitor which receives collected data from an imaging device on the vehicle. The mirror and monitor permit a driver to view the mirror image and collected data simultaneously. The driver may also manipulate the monitor and the imaging device to change views and the collected data.

26 Claims, 6 Drawing Sheets

U.S. PATENT DOCUMENTS

Figure 1:
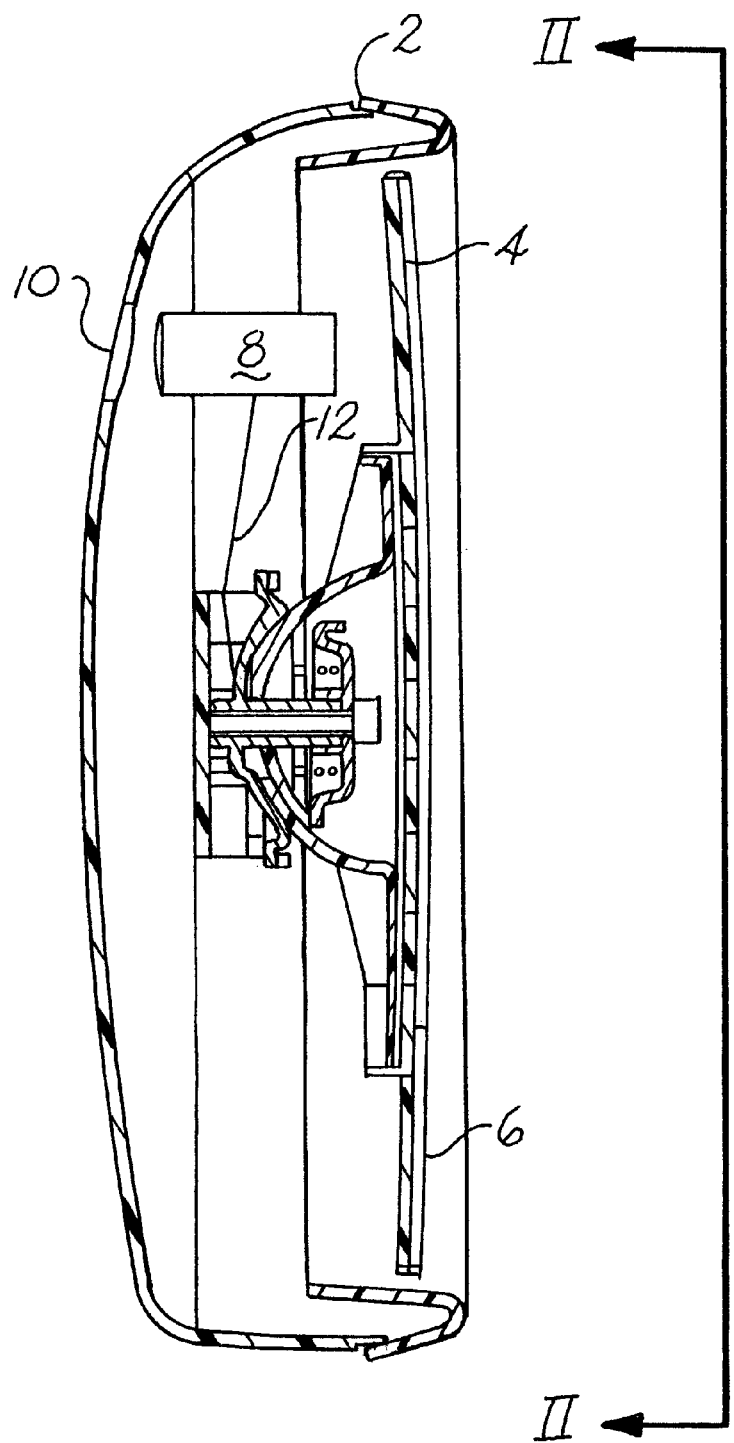

| | | |
|---|---|---|
| 2,263,382 A | 11/1941 | Gotzinger |
| 2,561,582 A | 7/1951 | Marbel |
| 2,580,014 A | 12/1951 | Gazda |
| 2,595,331 A | 5/1952 | Calihan et al. |
| 3,040,207 A | 6/1962 | Grontkowski |
| 3,266,016 A | 8/1966 | Maruyama et al. |
| 3,317,906 A | 5/1967 | Baldridge |
| 3,436,758 A | 4/1969 | Kluth |
| 3,532,871 A | 10/1970 | Shipman |
| 3,543,018 A | 11/1970 | Barcus et al. |
| 3,574,283 A | 4/1971 | Albers |
| 3,665,392 A | 5/1971 | Annas |
| 3,840,851 A | 10/1974 | Fowler et al. |
| 4,005,928 A | 2/1977 | Kmetz et al. |
| 4,023,029 A | 5/1977 | Fischer |
| 4,040,726 A | 8/1977 | Paca |
| 4,066,332 A | 1/1978 | Kato et al. |
| 4,109,235 A | 8/1978 | Bouthors |
| 4,167,113 A | 9/1979 | Mann |
| 4,274,078 A | 6/1981 | Isobe et al. |
| 4,299,444 A | 11/1981 | Römer |
| 4,443,057 A | 4/1984 | Bauer et al. |
| 4,463,411 A | 7/1984 | Proctor |
| 4,475,100 A | 10/1984 | Duh |
| 4,479,172 A | 10/1984 | Connor |
| 4,491,390 A | 1/1985 | TonShen |
| 4,499,451 A | 2/1985 | Suzuki et al. |
| 4,506,315 A | 3/1985 | Maekawa et al. |
| 4,516,197 A | 5/1985 | Yonkers |
| 4,583,155 A | 4/1986 | Hart |
| 4,588,267 A | 5/1986 | Pastore |
| 4,591,954 A | 5/1986 | Kawamura et al. |
| 4,603,946 A | 8/1986 | Kato et al. |
| 4,613,791 A | 9/1986 | Kurihara et al. |
| 4,623,222 A | 11/1986 | Itoh et al. |
| 4,626,967 A | 12/1986 | Segoshi |
| 4,630,904 A | 12/1986 | Pastore |
| 4,645,970 A | 2/1987 | Murphy |
| 4,646,210 A | 2/1987 | Skogler et al. |
| 4,659,967 A | 4/1987 | Dahl |
| D289,989 S | 5/1987 | Skogler et al. |
| 4,663,869 A | 5/1987 | Nakagawa |
| 4,665,321 A | 5/1987 | Chang et al. |
| 4,701,022 A | 10/1987 | Jacob |
| RE32,576 E | 1/1988 | Pastore |
| 4,733,335 A | 3/1988 | Serizawa et al. |
| 4,733,336 A | 3/1988 | Skogler et al. |
| 4,791,534 A | 12/1988 | Lindberg |
| 4,793,690 A | 12/1988 | Gahan et al. |
| 4,799,768 A | 1/1989 | Gahan |
| 4,807,096 A | 2/1989 | Skogler et al. |
| 4,841,198 A | 6/1989 | Wilhelm |
| 4,862,330 A | 8/1989 | Machida et al. |
| 4,868,459 A | 9/1989 | Dennerlein et al. |
| 4,868,719 A | 9/1989 | Kouchi et al. |
| 4,882,565 A | 11/1989 | Gallmeyer |
| 4,886,960 A | 12/1989 | Molyneux et al. |
| 4,893,063 A | 1/1990 | Pernyeszi |
| 4,916,430 A | 4/1990 | Vu et al. |
| 4,917,477 A | 4/1990 | Bechtel et al. |
| 4,929,866 A | 5/1990 | Murata et al. |
| 4,935,665 A | 6/1990 | Murata |
| 4,951,179 A | 8/1990 | Machida |
| 5,014,167 A | 5/1991 | Roberts |
| 5,029,060 A | 7/1991 | Aho et al. |
| 5,050,051 A | 9/1991 | Machida et al. |
| 5,059,015 A | 10/1991 | Tran |
| 5,072,340 A | 12/1991 | Jones |
| 5,093,768 A | 3/1992 | Ohe |
| 5,097,395 A | 3/1992 | Aho et al. |
| 5,150,966 A | 9/1992 | Nelson |
| 5,165,772 A | 11/1992 | Wu |
| 5,174,649 A | 12/1992 | Alston |
| 5,207,492 A | 5/1993 | Roberts |
| 5,211,466 A | 5/1993 | Jarocki et al. |
| 5,241,457 A | 8/1993 | Sasajima et al. |
| 5,272,602 A | 12/1993 | Sasajima et al. |
| 5,289,321 A | 2/1994 | Secor |
| 5,303,130 A | 4/1994 | Wei et al. |
| 5,355,284 A | 10/1994 | Roberts |
| 5,361,190 A | 11/1994 | Roberts et al. |
| 5,371,659 A | 12/1994 | Pastrick et al. |
| 5,388,035 A | 2/1995 | Bodem, Jr. |
| 5,404,869 A | 4/1995 | Parkyn, Jr. et al. |
| 5,436,741 A | 7/1995 | Crandall |
| 5,436,809 A | 7/1995 | Brassier et al. |
| 5,438,487 A | 8/1995 | Schmid et al. |
| 5,481,409 A | 1/1996 | Roberts |
| 5,497,305 A | 3/1996 | Pastrick et al. |
| 5,497,306 A | 3/1996 | Pastrick |
| 5,523,811 A | 6/1996 | Wada et al. |
| 5,528,422 A | 6/1996 | Roberts |
| 5,530,240 A | 6/1996 | Larson et al. |
| 5,574,443 A | 11/1996 | Hsieh |
| 5,587,699 A | 12/1996 | Faloon et al. |
| 5,642,238 A | 6/1997 | Sala |
| 5,677,979 A | 10/1997 | Squicciarini et al. |
| 5,680,123 A | 10/1997 | Lee |
| 5,788,357 A | 8/1998 | Muth et al. |
| 5,793,420 A | 8/1998 | Scmidt |
| 5,879,074 A | 3/1999 | Pastrick |
| 5,910,854 A | 6/1999 | Varaprasad et al. |
| 5,940,120 A | 8/1999 | Frankhouse et al. |
| 5,956,181 A | 9/1999 | Lin |
| 5,978,017 A | 11/1999 | Tino |
| 6,045,243 A | 4/2000 | Muth et al. |
| 6,163,338 A | 12/2000 | Johnson et al. |
| 6,222,447 B1 | 4/2001 | Schofield et al. |

FOREIGN PATENT DOCUMENTS

| | | |
|---|---|---|
| JP | 58085110 | 5/1983 |
| JP | 62091092 | 4/1987 |
| JP | 62166135 | 7/1987 |
| JP | 04257189 | 9/1992 |
| JP | 05137144 | 6/1993 |
| JP | 08058470 | 3/1996 |
| JP | 09272399 | 10/1997 |
| JP | 10076880 | 3/1998 |
| JP | 11078693 | 3/1999 |
| JP | 2000062532 | 2/2000 |
| JP | 2000128031 | 5/2000 |
| WO | WO 0018612 | 4/2000 |

OTHER PUBLICATIONS

European Search Report dated Jan. 21, 2002 with Verified English translation.

English language Abstract of JP 08058470, European Patent Office.

English language Abstract of JP 11078693, European Patent Office.

English language Abstract of DE 19741896, Derwent Info. Ltd. (c) 2002.

U. S. application No. 09/303,503, filed Apr. 30, 1999.

U.S. Patent Application No. 09/731575, Dec. 7, 2000, corresponding to German Application No. DE 10036875.1, Jul. 28, 2000.

U.S. Patent Application No. 09304,002, Apr. 30, 1999, corresponding to German Application No. DE 19902486.3, Jan. 22, 1999.

U.S. Patent Application No. 09/303,503, Apr. 30, 1999, corresponding to German Application No. DE 19903595.4, Jan. 29, 1999.

English Language Abstract of DE 19921488, Nov. 16, 2000.

REARVIEW MIRROR ASSEMBLY FOR A VEHICLE WITH MONITOR

DESCRIPTION

The invention concerns a rearview mirror for vehicles, in particular, for commercial vehicles wherein said mirror possesses an optical imaging apparatus in accord with the generic concept of claim 1.

US-PS-4,882-565 has disclosed a rearview mirror for vehicles, wherein in the reflecting surface an indicator device is integrated, which is provided with light from an illumination means located behind the mirror surface. With this device, simple warning signals or stylized presentations of various functional units can be presented and brought to the rearview mirror for attention. The images produced by a camera are not presented here.

Upon making a turn with a vehicle from a subordinate street into a main thoroughfare, normally, the driver makes use of the rear vision mirror, before he turns. In the case of a right turn, in doing this, he has not only the right side mirror with the visible rearward area, but also the view to the right-front over the mirror in his field of sight. To be aware of risks or traffic on the left side, he must turn his head and if necessary, use the left rearview mirror. In heavy traffic, therefore, he is obliged to change both his direction of vision and the position of his head, wherein respectively, while he is looking to one side, the other side is not being tended to. This can lead to dangerous situations.

It is the purpose of the present invention, to develop a rearview mirror with an optical imaging device, of such a nature, that the most different areas surrounding the vehicle will come to the attention of the driver.

The achievement of this purpose is accomplished by the features of claim 1.

By means of the provision of a monitor, which is placed in the rearview mirror, an image produced by a camera can be transmitted to the said monitor. The camera can be directed to a field of vision, which is not in the view angle of the driver when he looks into the mirror. With the advantage of the invention, the driver, with one glance, can not only discern the area directly in the reflected angle of the mirror, as well as the area in front of the mirror, but he can also see another area on the monitor in the mirror without needing to change his direction of view nor to turn his head. In the case of the monitor, advantageously an LCD image is employed and the camera would, advantageously, also be a CCD-camera.

In accord with an advantageous embodiment of the invention, the monitor is placed in the edge area of the mirror, that is, the mirror pane, in order not to interfere with the fundamental purpose of the mirror. This opens up the possibility, that the monitor need not be integrated into the mirror pane, but rather be placed in a position under, beside or above the mirror pane. The placement of the monitor would be effected by an appropriate recess in the mirror housing.

In accord with an advantageous embodiment of the invention, following Claim 3, the camera is likewise installed within the mirror housing, whereby the incident light on the camera is made possible by a corresponding opening in the mirror housing.

In accord with an advantageous embodiment of the invention, enabled by Claim 4, the camera is designed to be pivoted, so that different areas about the vehicle can be brought into view and depicted in the monitor. When backing up is a necessity, then the zone behind the vehicle can be seen in the monitor.

In accord with another advantageous embodiment of the invention, claim 7 allows for a plurality of cameras. With this multi-camera arrangement, switching among the individual cameras again allows various areas around the vehicle to be presented in the monitor.

If this latter plan is followed, then the pivoting of the camera becomes redundant. The respective camera can be placed in an optimal position to scan the current area to be overseen. The camera for the backing up operation is logically to be installed on the back side of the vehicle.

If, additionally, a plurality of monitors are available (see Claim 8) then, under certain circumstances, selective switching from camera to camera becomes unnecessary, since one camera each can be apportioned to one monitor. Additionally, the possibility also exists that on various monitors and particularly in different areas of presentation, in one monitor additional data can be shown, such as temperature, speed, assured clear distance behind, to the front, or to the side can be imaged in. The different presentation areas of a monitor should be understood in the sense, that on the monitor different items can be shown by means of an image within an image format.

In accord with a further advantageous embodiment, as presented in Claim 9, the rearview mirror can encompass a first and a second monitor. The first monitor is connected with a camera in one rearview mirror, and the second monitor is connected to a camera in the other side rearview mirror of a vehicle. Thus, this arrangement allows a greater area around the vehicle to be scanned at one glance.

By means of an image and data memory apparatus, as taught by Claims 11 and 12, what is essentially a "black-box" function can be brought about. For this purpose, the continuous images of the last five minutes, from one or more cameras can be retained in memory. Additionally, relevant data such as temperature, weather, time, and speed can also be saved. By this means, an accident can be more easily reconstructed.

In accord with Claim 12, the image surface of the monitor (s) is angled differently than that of the mirror surface. This is to prevent showing the same image in the monitor as is normally reflected in the mirror.

By means of a digital zoom, that is, by the digital selection of an image component, as stated in Claim 13, a function can be realized similar to that obtained by the pivoting of a camera.

Further details, features and advantages of the invention can be inferred from the following description of preferred embodiments with the help of the drawing.

Figure 2:
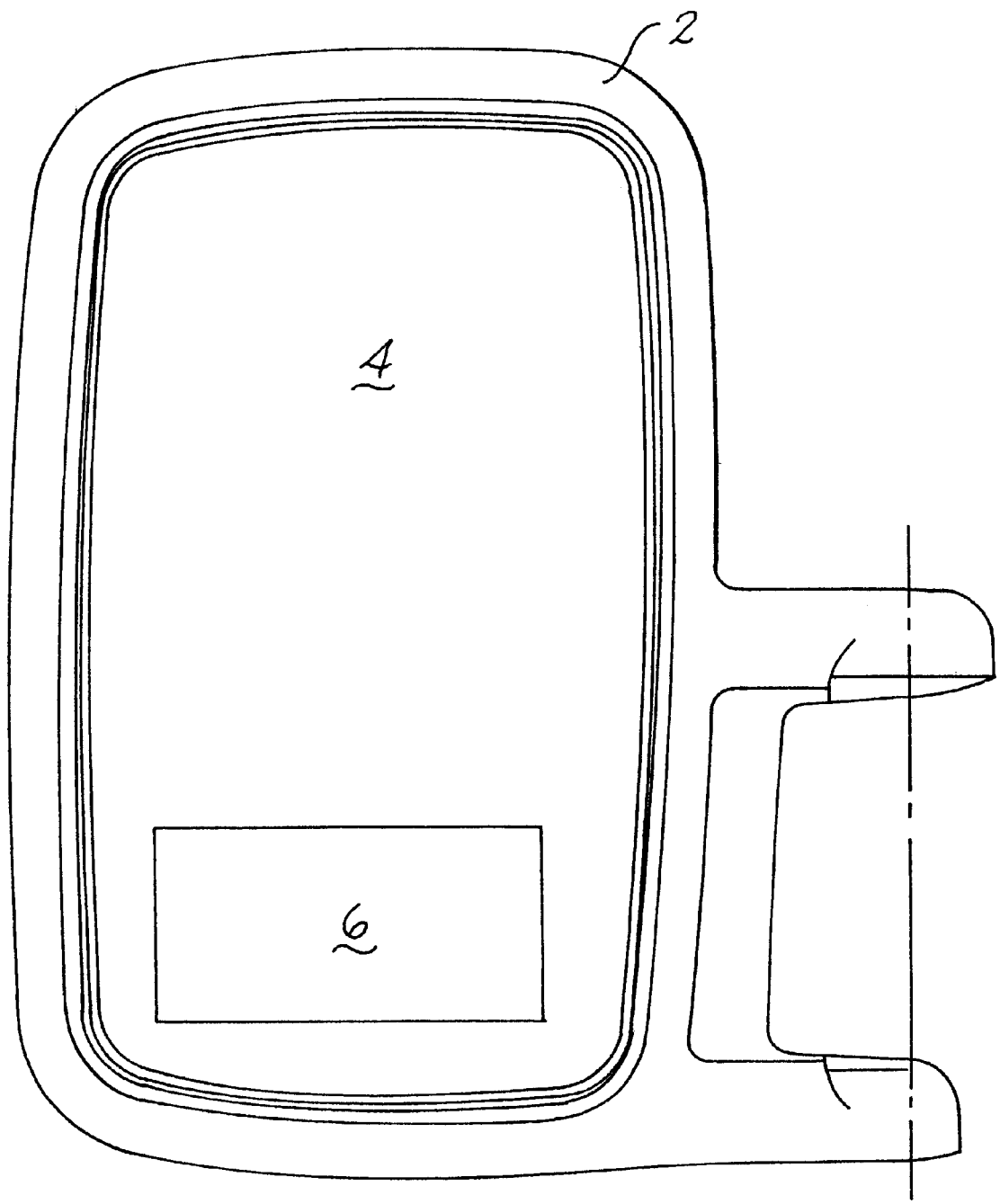
Figure 3:
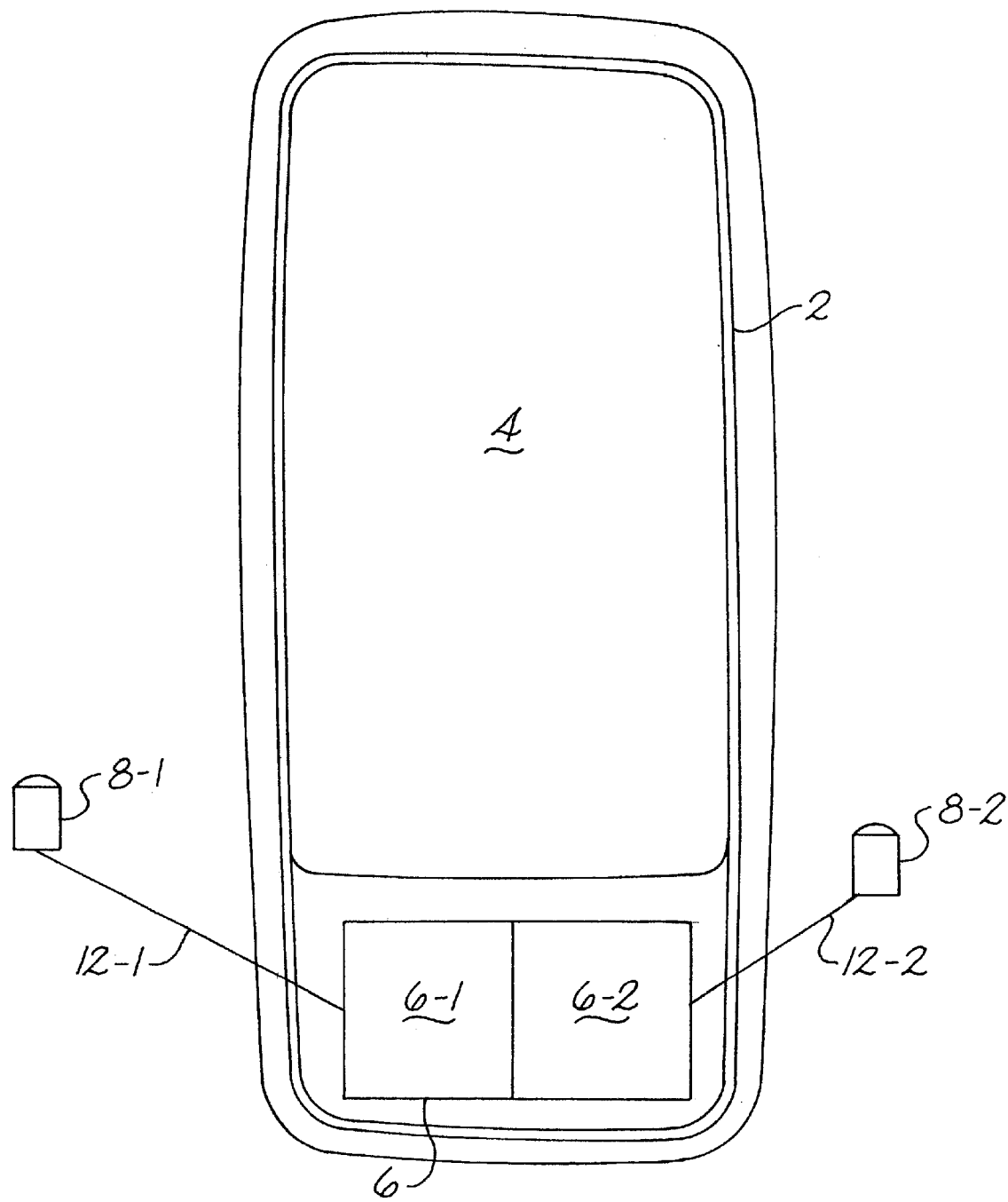
Figure 4:
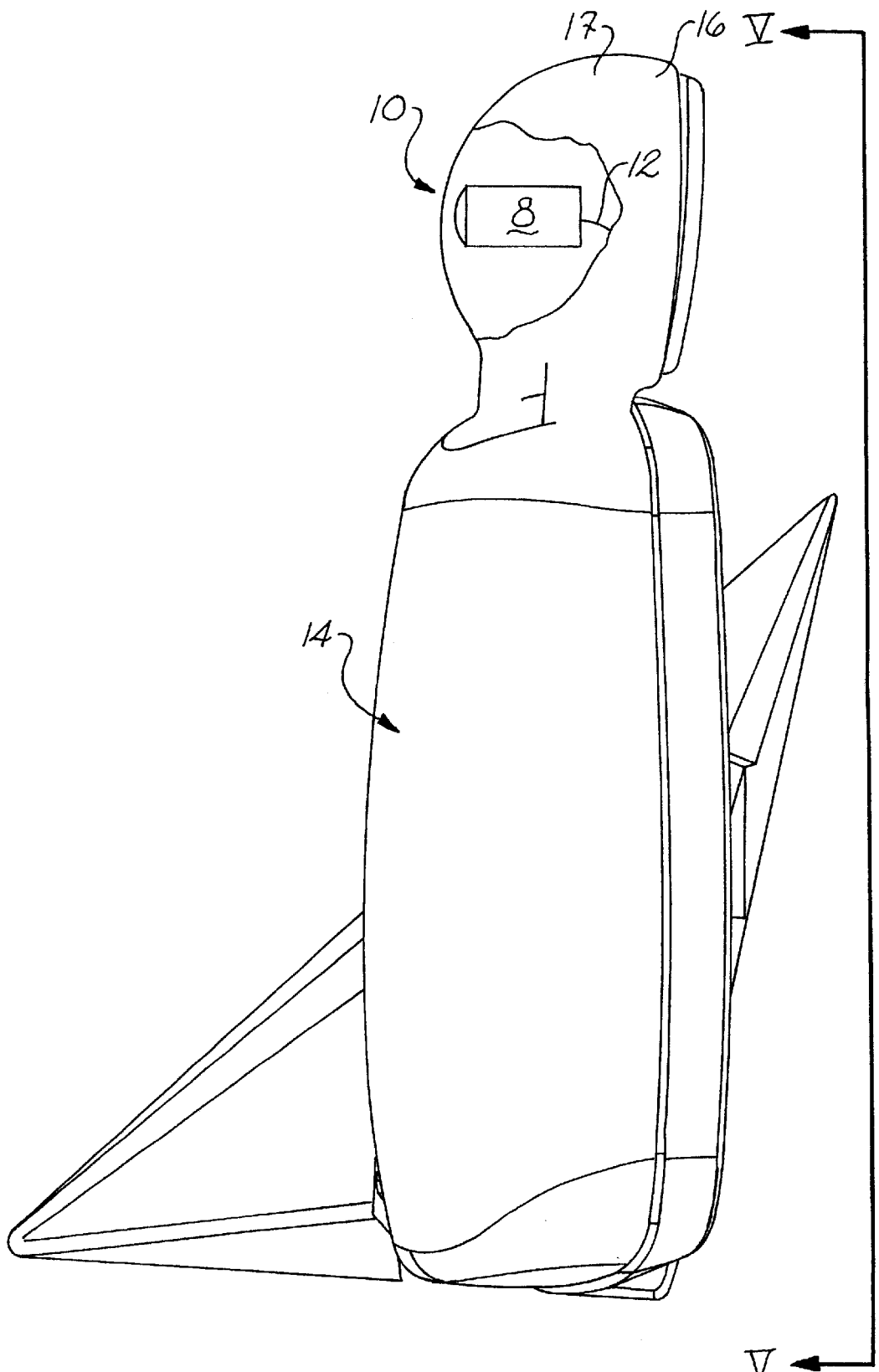
Figure 5:
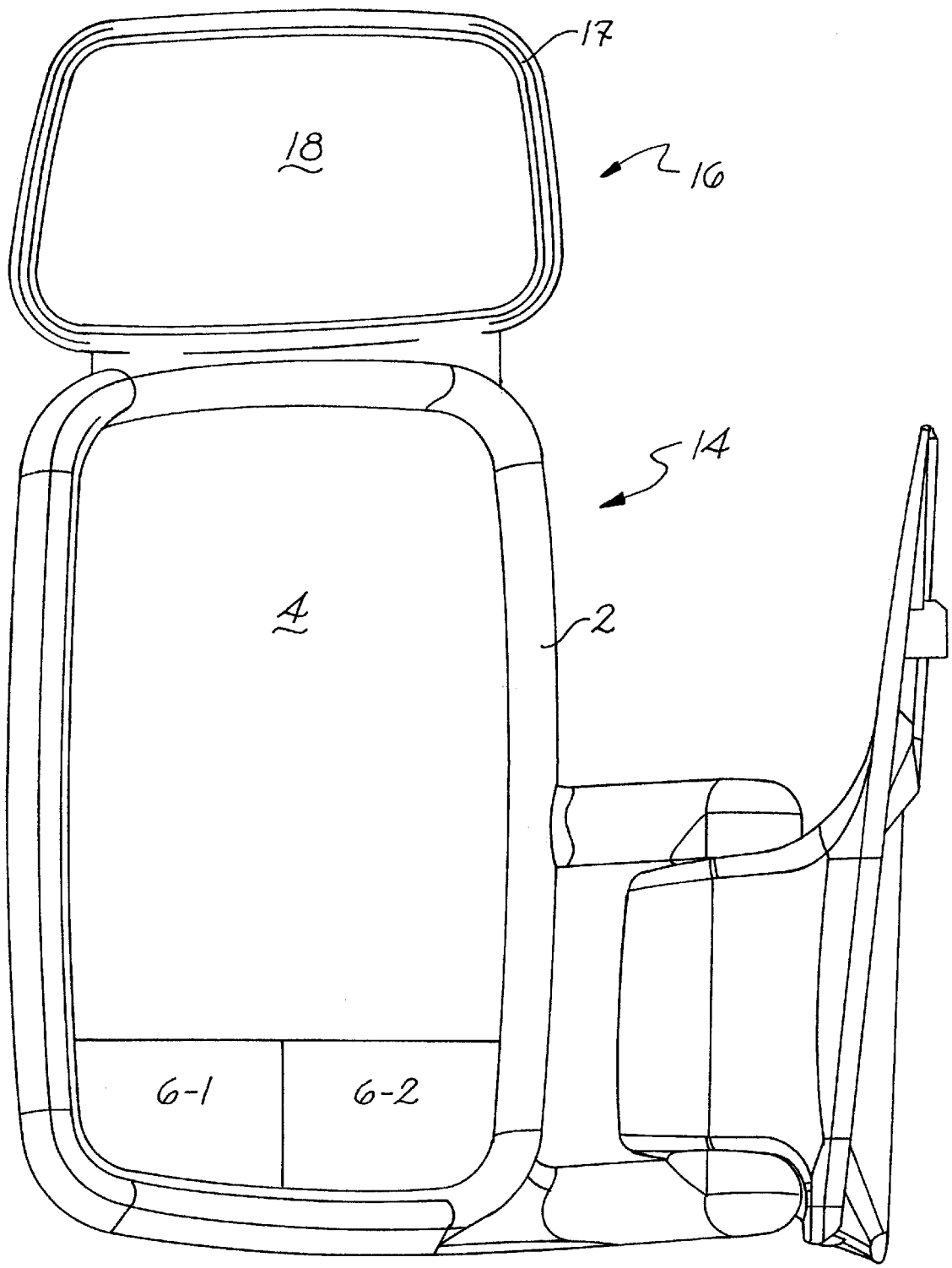
Figure 6:
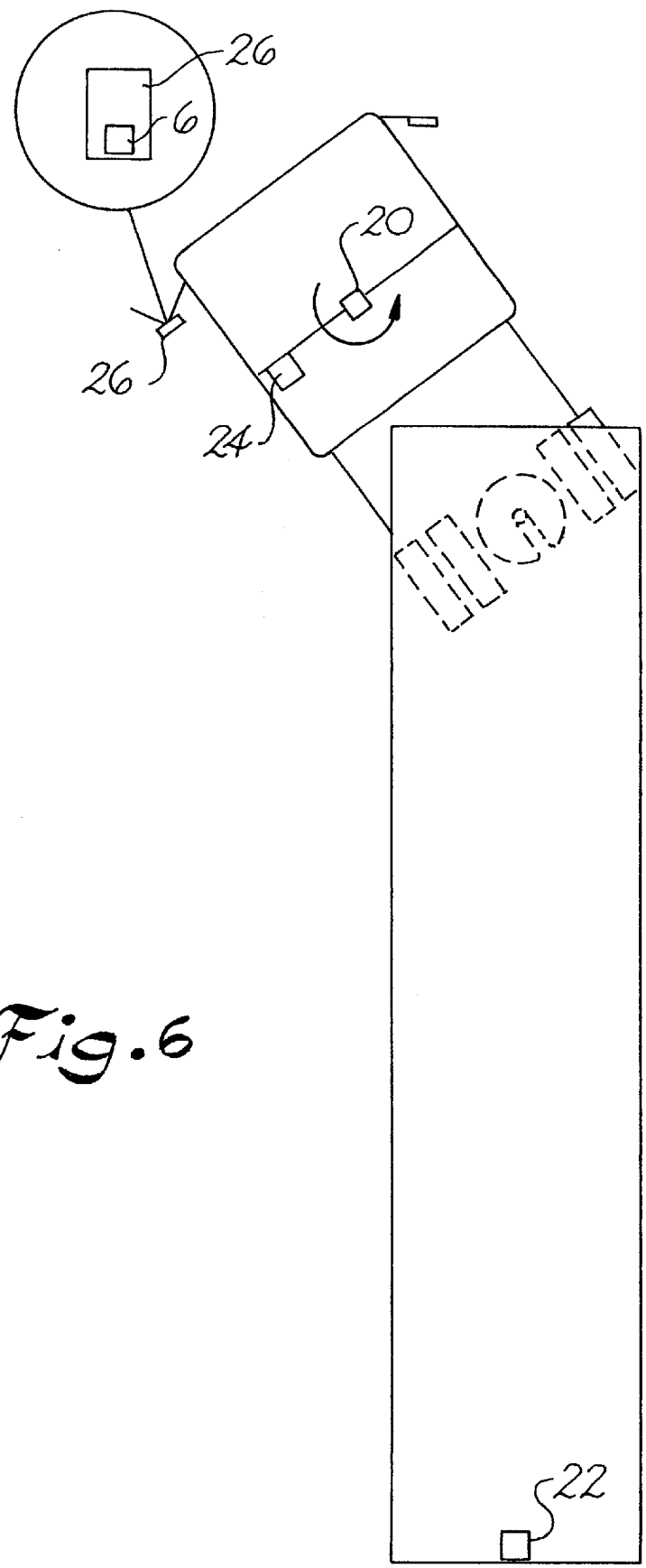

There is shown in:

FIG. 1 a sectional view of a first embodiment of the invention;

FIG. 2 a front view of a mirror in accord with the first embodiment taken in a direction of line II—II of FIG. 1;

FIG. 3 a schematic presentation of a second embodiment of the invention;

FIG. 4 a side view of a third embodiment of the invention;

FIG. 5 a front view of the mirror in accord with the third embodiment taken in a direction of line V—V of FIG. 4; and FIG. 6 a schematic presentation of a fourth embodiment of the invention.

In FIGS. 1 and 2, is shown a first embodiment of an invented rearview mirror. The rearview mirror comprises a mirror housing 2, a mirror pane 4 which is adjustably placed in said mirror housing 2, and an optical imaging apparatus, which is integrated into the mirror surface in the form of a monitor 6. Likewise, included in the mirror housing 2 is a camera, especially a CCD-Camera 8, which opens through an aperture 10 looking forward in the direction of travel. The monitor 6 is connected to the camera 8 by means of a cable 12. In this way, a camera 8 in the mirror housing 2 of a left rearview mirror, advantageously is adjusted at an angle forward and to the right, because an area is thus brought into view, which otherwise would not be in the visible sector, when the driver looks in the said left rearview mirror.

In a schematic manner, FIG. 3 depicts a second embodiment of the invention, which includes a first camera 8-1 and a second camera 8-2 as well as a monitor 6 that has a left view sector 6-1 and a right view sector 6-2. As is indicated by the presence of cable 12-1 and 12-2, the first camera 8-1 images on the left presentation zone 6-1 and the second camera 8-2 images on the right presentation zone 6-2. Contrary to the first embodiment, the monitor is not integrated into the mirror side 4, but rather placed thereunder in the mirror housing 2.

This first camera 8-1 governs a view to the left of the vehicle, as seen in the traveling direction, and brings the image to the left presentation area 6-1. The second camera 8-2 scans an area to the right of the vehicle and this image is brought to the right presentation area 6-2.

FIGS. 4 and 5 illustrate a third embodiment of the invention in which a variant of the second embodiment is presented. The rearview mirror, in accord with the third embodiment, includes a main mirror 14 with a mirror pane 4 and an auxiliary mirror 16 superimposed on the main mirror 14, for which auxiliary mirror 16 an individual housing 17 and pane 18 is provided. A first camera 8 is placed within the auxiliary mirror housing 17 of the left-side rearview mirror and through an opening 10 the view thereof is pointed in the direction of travel. A second camera (not further described) is placed in the right-side rearview mirror. In the lower area of the mirror pane 4 of the main mirror 14 is provided a monitor 6 with a left 6-1 and a right image presentation zone 6-2. By means of a cable 12 the first camera is connected with the left presentation zone 6-1 and the second camera (not shown) is connected to the right presentation zone 6-2 in the rearview mirror to the left of the driver.

FIG. 6 shows a fourth embodiment of the invention, with a forward facing, pivoting camera 20 which is located on the top side of the roof of a tractor and a camera 22 facing to the rear on the trailer of said tractor. In a left side, rearview mirror 26, a monitor 6 is placed, which allows, optionally by means of an operative device, connection to either the forward pivoting camera 20 or the rear camera 22. The pivoting camera 20 can be rotated by means of the operative apparatus 24, whereby the field of view of the camera 20 can widely varied.

When backing up is required, by means of corresponding switching by the operating apparatus 24, the image of the back viewing camera 22 is switched to the monitor 6, so that in the left rearview mirror 26, the view of camera 22 is presented. Upon need, the driver can then, again with the said operating apparatus 24, restore the viewing field of the forward camera 20 onto the monitor 6.

The fourth embodiment, in accord with FIG. 6, allows itself to be so modified, that, as in the case of the second and the third embodiments, two presentation zones or two monitors for the two cameras are provided.

What is claimed is:

1. A rearview mirror assembly for a vehicle comprising:
a mirror housing for attachment to the vehicle;
a mirror pane attached to the mirror housing, the mirror pane disposed in a field of view of a driver of the vehicle;
a monitor positioned in the mirror housing and disposed in the field of view of the driver of the vehicle such that the monitor and the mirror pane are viewed by the driver; and
an imaging device in electrical communication with the monitor, the imaging device configured to collect image data from a field of view proximate the vehicle, the monitor displaying an image responsive to the image data collected by the imaging device.

2. The rearview mirror assembly of claim 1, wherein the monitor is disposed in an edge of the mirror pane.

3. The rearview mirror assembly of claim 1, wherein the monitor is disposed spaced from the mirror pane.

4. The rearview mirror assembly of claim 1, wherein the monitor is an optical imaging monitor.

5. The rearview mirror assembly as in claim 1, wherein the monitor includes a plurality of optical imaging monitors.

6. The rearview mirror assembly of claim 1, wherein the monitor includes a plurality of device presentation zones.

7. The rearview mirror as in claim 1, wherein the imaging device is an optical imaging device.

8. The rearview mirror assembly of claim 7, wherein the optical imaging device is a first optical imaging camera and a second optical imaging camera, the first optical imaging camera disposed to image a first field of view, the monitor configured to present the first field of view in a first field presentation zone, the second optical imaging camera disposed to image a second field of view, the monitor configured to present the second field of view in a second presentation zone.

9. The rearview mirror assembly of claim 1, wherein the imaging device includes at least one optical imaging camera.

10. The rearview mirror assembly as in claim 9, wherein the at least one optical imaging camera is disposed in the mirror housing.

11. The rearview mirror assembly of claim 10, wherein the mirror pane and the at least one optical imaging camera disposed in the mirror housing have different angles of light incidence.

12. The rearview mirror assembly of claim 9, wherein the at least one optical imaging camera is disposed at a location on the vehicle in an other than forward location.

13. The rearview mirror assembly of claim 12, wherein the other than forward location is a lateral vehicle location.

14. The rearview mirror assembly of claim 13, wherein the other than forward location is a rear vehicle location.

15. The rearview mirror assembly of claim 1, further comprising an operating apparatus, the operating apparatus disposed proximate the driver and configured for the driver to adjust the monitor and the imaging device.

16. The rearview mirror assembly of claim 1, wherein the imaging device is pivotable.

17. The rearview mirror assembly of claim 1, wherein the vehicle field of view is greater than an imaging device field of view.

18. The rearview mirror assembly of claim 1, wherein the vehicle field of view is equal to an imaging device field of view.

19. The rearview mirror assembly of claim 18, wherein the imaging device field of view is adjustable.

20. The rearview mirror assembly of claim 1, further comprising a data memory apparatus in electrical communication with the imaging device to preserve a collection of data from the imaging device.

21. The rearview mirror assembly of claim 20, wherein the collection of data is speed, temperature, time, weather, and optical images.

22. The rearview mirror assembly of claim 21, wherein the collection of data is selectable.

23. The rearview mirror assembly of claim 1, wherein the imaging device has adjustable magnification.

24. A rearview mirror assembly for a vehicle comprising:
a mirror housing with mirror pane disposed in a field of view of a driver of the vehicle, the mirror housing configured for attachment to the vehicle;
a monitor positioned in the mirror housing and disposed in the field of view of the driver of the vehicle such that the monitor and the mirror pane are viewed by the driver; and
an imaging device disposed in the mirror housing in electrical communication with the monitor, the imaging device configured to collect image data from a field of view proximate the vehicle, the monitor displaying an image responsive to the image data collected by the imaging device.

25. The rearview mirror assembly of claim 24, wherein the monitor is selected from the group consisting of a plurality of optical imaging monitors, a plurality of device presentation zones, and combinations thereof.

26. The rearview mirror assembly of claim 24, further comprising an auxiliary mirror pane, the monitor spaced apart from the auxiliary mirror pane.

\* \* \* \* \*